Oct. 21, 1958 E. W. THILES 2,857,199
WAGON BOX AND TRUCK COVER
Filed Feb. 27, 1957
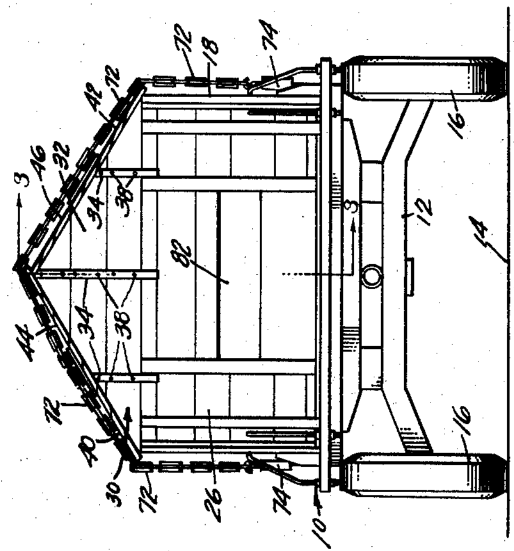
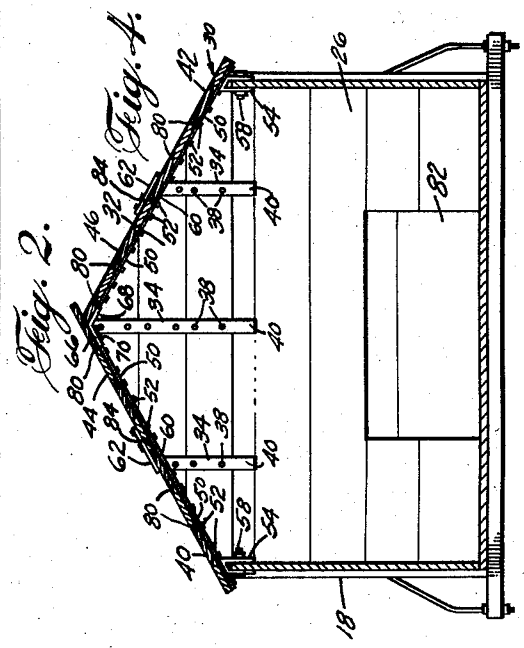
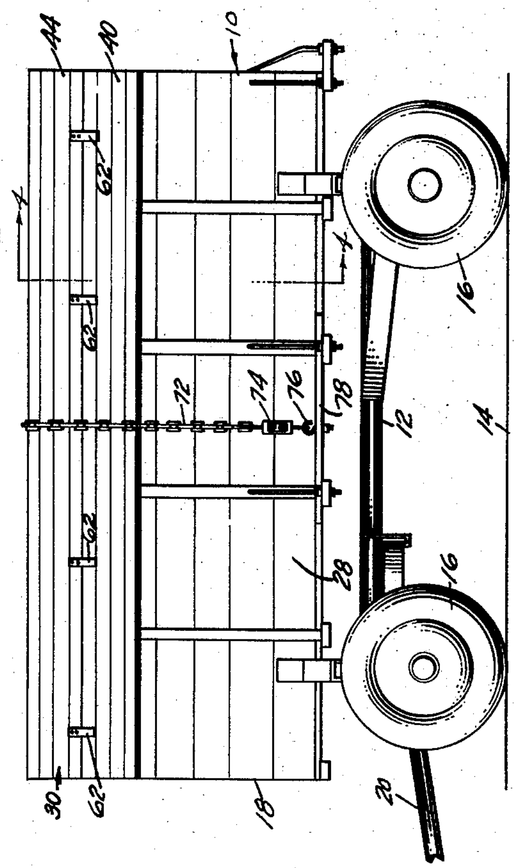
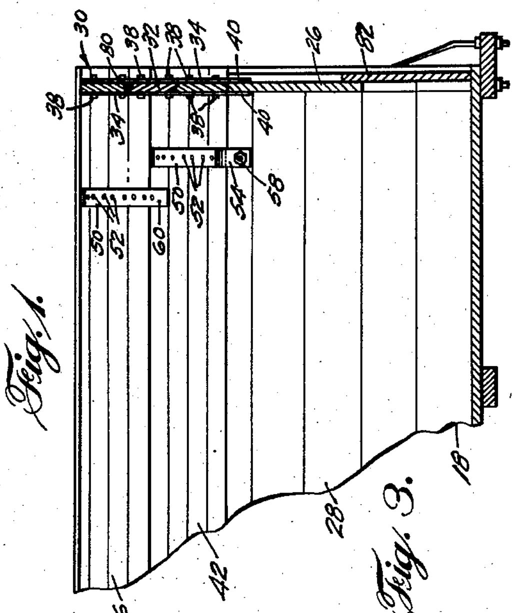
INVENTOR.
Edward W. Thiles
BY A. Hiram Sturges
Agent United States Patent Office 2,857,199

Patented Oct. 21, 1958

2,857,199

WAGON BOX AND TRUCK COVER

Edward W. Thiles, Woodbine, Iowa

Application February 27, 1957, Serial No. 642,772

2 Claims. (Cl. 296—100)

This invention relates to a cover for a wagon, truck or the like and more particularly it is an object of my invention to provide a rigid protective cover which is easily removable and replaceable over the open top of a wagon box.

Another object of my invention is to provide a rigid weather proof cover for a wagon box comprising sections whereby the cover is easily assembled and disassembled by one man and one which takes up a minimum of storage space.

A further object of my invention is to provide a simple attaching means for securing the cover to the box and wherein the several parts are held by interlocking fasteners, access to the wagon box being made by sliding a section of the cover forwardly or rearwardly.

Yet another object is to provide a wagon box cover, which will fulfill the above intended objects of a simplified construction which can be manufactured economically.

The farm wagon is of great utility on a farm and is employed in many and various jobs. Sometimes it is necessary that a wagon must remain loaded for a period of time and in these instances it is most desirable that the contents thereof be protected from the weather.

For example, a cattle or hog feeder may use his wagon to carry feed to the feed lot whereby the wagon is pulled into the feed lot and the feed may be scooped from the wagon. However if the feed is not fully used, the remainder is left on the wagon and if the wagon cannot be properly sheltered, the feed therein is exposed to the elements. Should it happen that the feed is subjected to the dampness resulting from rain or snow, it will shortly mold and sour making it unsuitable for consumption.

For instance, should the wagon contain ground corn and only a portion thereof is fed over a week's time and subjected to weather, it becomes old. Now, if fresh ground corn is loaded onto the wagon covering the older corn, this means that the older corn is not used up in time to gain the most feed benefit therefrom.

It is therefore another object of my invention to provide a simple but adequate wagon box cover which will retard the contamination of feed and the like stored in the wagon due to its being subjected to the effects of weathering as heretofore.

Still a further object is to provide a wagon box cover of simple construction but efficient in protecting the contents of the wagon against the elements.

Another object is to provide a wagon box cover of such construction that it is portable and easily handled by one man without great effort.

Another object is to provide a wagon box cover of a construction described which may be easily disassembled for storing in a small space and in a sheltered place whereby maintanence is economical.

Yet another object is to provide a wagon box cover, the principles of which may be adapted to pick-up trucks or the like and, also in such use, it is conceivable that the cover may be used for and can prvoide shelter on camping and fishing trips.

With these and other objects in view, my invention consists in the construction, arrangement and combination of the several parts of my device, whereby the objectives above set forth are attained as, hereinafter more fully set forth in detail, and illustrated in the accompanying drawing, in which:

Figure 1 is a side elevation of a farm wagon having the wagon box cover of my invention mounted thereon;

Figure 2 is a rear end view of the wagon shown in Figure 1 showing an end elevation of the wagon box cover of my invention as mounted on the wagon box;

Figure 3 is an enlarged and fragmentary vertical cross sectional view of the rear portion of the wagon box as seen along the line 3—3 of Figure 2; and Figure 4 is a vertical transverse cross sectional view of the wagon box and wagon box cover taken along the line 4—4 of Figure 1.

Referring to the drawings in more detail, like numerals designate like parts in the several views wherein the Figure 10 generally indicates a farm wagon built in accordance with the usual standard construction having a frame or under-carriage 12 supported above the ground 14 on wheels 16, and an open top box 18 securely mounted upon the frame 12. A tongue 20 extends forwardly from the front axle for attachment to a tractor or other means of power.

The wagon box 18 has forward and rearward end walls 26 and side walls 28.

The wagon box cover of my invention is shown assembled and mounted over the open top of the wagon box 18, generally designated by the numeral 30 and comprises transversely arranged end sections or roof supporting sections 32 one being mounted on the wagon box at its forward end and one mounted at its rear end.

The end sections 32 are identical in construction and therefore only a rear end section 32 is fully illustrated in the drawing and it will be understood that the description thereof is intended to include the forward end section as well.

The end sections are of triangular shape in elevation having the apex thereof disposed upwardly, the side edges diverge from the apex or peak to and meet with the respective side walls 28 of the wagon box 18 at any desired angle.

The end sections 32 are made up of several lengths of material, preferably wood, disposed one above the other and rigidly secured together by spaced apart metal straps 34 disposed transversely thereto. The straps 34 are fastened to the end section in aligned opposed positions on the inner and outer sides of the end sections 32 and fastened by screws or bolts 38.

Lower end portions 40 of each of the straps 34 extend a substantial distance below the base or lower edge of the end section 32.

In assembly the base or lower edge of the end sections is in meeting relation with the upper edge of the front and rear end walls 26 of the wagon box 18 and the extended lower portions 40 of the straps 34 form forks which engage about the upper edge of the wagon box end walls 26 and serve to position the end sections and maintain them in an upright assembly position.

The cover further comprises a plurality of roof sections adapted to rest upon the sides of the wagon box 18 and the inclined edges of the end sections 32.

There are four interlocking roof sections or panels, a left side lower section 40, a right side lower section 42, a left side upper section 44 and a right side upper section 46.

The lower roof sections 40 and 42 are identical in construction. However, the upper left side roof section 44 has an extended upper edge which overlaps the upper edge of the section 46, as best seen in end elevation and for a purpose later described.

The order in which the sections have been set forth above is only for convenience of description and since the sections are interchangeable, they need not be assembled in that exact order.

The roof sections are of flat elongated rectangular shape and like the end sections are built up of several lengths of material disposed one above the other and secured together by means of straps 50 fastened by screws or bolts 52. The straps 50 are fastened on the underside of each of the roof sections and disposed transversely thereof in spaced apart positions along its length.

The lower roof sections 40 and 42 are removably attached to the sides 28 of the wagon box 18 and are secured in their respective positions by suitable anchoring means such as inverted U-shaped brackets 54.

The brackets 54 are fixed to the undersurface of the forward and rearward most straps 50 and adjacent the lower end thereof. The brackets are preferably welded to the straps 50 and extend downwardly therefrom. The spaced apart legs of the U-shaped brackets form upwardly opening slots for receiving the upper edge of the side walls 28 of the wagon box therein.

The brackets 54 may be locked in position by a bolt 58 which extends transversely through the bracket and side wall 28. In assembly, the respective lower edge of the upper roof sections 44 and 46 abut the respective upper edge of the lower roof sections 40 and 42.

The interlocking feature lies in the provision of extended lower end portion 60 of the straps 50 of the upper sections and the addition of short lengths of strap iron forming cleats 62 on the upper surfaces of the upper roof sections adjacent the lower edge of the section and of a length to extend beyond the lower edge over the lower sections and in corresponding relation to the lower ends 60 of the straps 50.

The lower end portions of the straps 50 of the upper sections engage about the upper edge of the lower sections whereby the lower sections 40 and 42 and the end sections 32 maintain the upper roof sections 44 and 46 in assembled positions.

As best seen in the cross sectional view of Figure 4, the upper edge of the upper left side roof section 44 is extended beyond and overlaps the upper edge of the upper right side roof section 46. The purpose of this extension is primarily to provide a simple self-supporting and weather-proof ridge.

To further insure longitudinal support at the ridge of the roof sections 44 and 46 angled brackets 66 having downwardly extending flanges 68 are spaced along the length of the upper left side roof section 44 on the under side thereof and at a point spaced downwardly from its upper edge.

The angles 66 are secured by screws or bolts 70.

In assembly, it will be seen that the outwardly extending flange 68 of the angle bars 66 permit longitudinal support of the upper edge of the right hand roof section 46 thereon.

To complete the assembly, means are provided for anchoring the assembled wagon box cover in place comprising a length of chain 72 disposed over and about the rigid cover. The ends of the chain 72 are attached to upper ends of chain tighteners or as shown in the drawings a pair of turn buckles 74. The lower ends of the turn buckles are attached to eye-bolts 76 which latter are secured in the sill or side step 78 of the wagon box 18.

Only one turn buckle need be employed in this arrangement if desired. However, it is believed that a closer adjustment of equal tension is gained in the use of two whereby the cover may be drawn down against the wagon box in such a manner as to prevent undue strain and warpage.

It is believed that the operation of the wagon box cover and the method of assembly and disassembly is apparent from the above detailed description.

It is to be understood that the several sections may be of single piece construction and that any suitable material may be used and suitable reinforcement may be used to lend rigidity to the several sections.

The sections as illustrated and described are preferably built up of wood of conventional lengths and widths only for reason of economy and availability of materials.

The slope of the roof sections may be of any desired angle but sufficient to permit thorough drainage or water runoff. The arrangement of the roof ridge and the overhanging roof portions extending beyond the wagon box sides add to the weatherability of the invention.

Referring to Figure 4, it will be seen that the upper and lower edges of the respective lower and upper roof sections 40—46 are beveled outwardly and downwardly for the purpose of providing a weather seal and to deflect water and snow. Since this joint is an abutting or loose joint, it is important that the beveled edges 84 or similar means be employed to prevent rain from entering the wagon box and contaminate the contents thereof.

In addition, each joint of the several sections is extremely beveled as seen at 80 to prevent water seepage and deflect rain.

However, it will be understood that if a single piece of material is used for the sections, as mentioned above, that only the beveled joint 84 between the sections need be employed.

The assembly will not interfere with the normal operation of the end gate 82 of the wagon box 18 but if access to the wagon box 18 from above is desired, the operator may remove the bolts 58 from the brackets 54 on one side of the wagon whereby that lower roof section may be slid forwardly or rearwardly sufficient to make access to the wagon box 18.

Likewise, if the operator desires to remove a forward or rearward end wall 26 of the wagon box 18, the bolts 58 on both sides of the wagon box 18 are removed from the brackets 54 whereby the wagon box cover 30 as a unit may be slid forwardly or rearwardly a sufficient distance to allow removal of the end wall 26 upwardly and outwardly of its supports.

While I have herein shown and described my invention in the one particular form, it is obvious, as mentioned hereinabove, that structural changes may be employed, all without departing from the spirit of the invention and it is to be particularly pointed out that the invention is not primarily limited to wagon boxes and I, therefore, do not wish to be limited to that precise form beyond the limitations which may be imposed by the following claims.

I claim

1. A vehicle body cover comprising triangular-shaped end walls designed to be positioned on upper edges of the end walls of an open vehicle body having side and end walls extended from a floor, the upper edges of said triangular-shaped end walls being inclined downwardly from high points at the center to the lower edges of the walls, horizontally spaced vertically disposed straps secured to inner and outer surfaces of said triangular-shaped end walls, the lower ends of the straps being positioned to straddle upper edges of the end walls of the vehicle body, elongated upper and lower roof panels resting upon the inclined upper edges of the triangular-shaped end walls and extended over upper edges of the side walls of the body, the upper edge of the upper roof panel on one side of the body extending over the upper edge of the upper roof panel on the opposite side of the body, the upper and lower roof panels being reinforced with upwardly disposed horizontally spaced straps and lower ends of the straps of the lower panels having U-shaped formations with vertically positioned arms thereon, and the arms of the U-shaped formations being positioned to straddle upper edges of the side walls of the body, longitudinally disposed reinforcing elements extended below upper edges of the upper roof panels, and cleats on outer surfaces of lower edges of the upper panels extended over the upper edges of the lower panels.

2. In a vehicle body cover, the combination which comprises triangular-shaped end walls designed to be positioned on upper edges of the end walls of an open vehicle body having side and end walls extended from a floor, the upper edges of said triangular-shaped end walls being inclined downwardly from high points at the center to the lower edges of the triangular-shaped end walls, horizontally spaced vertically disposed straps secured to inner and outer surfaces of said triangular-shaped end walls, the lower ends of the straps being positioned to straddle upper edges of the end walls of the vhicle body, elongated upper and lower roof panels resting upon the inclined upper edges of the triangular-shaped end walls and extended over upper edges of the side walls of the body, a longitudinally disposed angle bar positioned on the vertexes of the triangular-shaped end walls for supporting upper edges of the upper panels, the upper edge of the upper roof panel on one side of the roof extending over the upper edge of the upper roof panel on the opposite side of the roof, the upper and lower roof panels being reinforced with vertically disposed horizontally spaced straps and lower ends of the straps of the lower panels having U-shaped formations thereon, the arms of the U-shaped formations being vertically disposed and positioned to straddle the upper edges of the side walls of the body, cleats on the outer surfaces of the lower edges of the upper panels and extended over the upper edges of the lower panels for retaining the panels in alignment, and a chain extended over the roof panels and positioned with ends thereof secured to outer edges of the floor of the vehicle body for retaining the roof in position on the body.

References Cited in the file of this patent

UNITED STATES PATENTS

| | | |
|---|---|---|
| 205,099 | Jannopoulo | June 18, 1878 |
| 335,718 | Price | Feb. 9, 1886 |
| 928,495 | Busenbark | July 20, 1909 |
| 1,038,591 | Johnson | Sept. 17, 1912 |
| 1,080,948 | Bigbie et al. | Dec. 9, 1913 |
| 1,117,823 | Fitzgerald | Nov. 17, 1914 |
| 1,173,352 | Higdon | Feb. 29, 1916 |
| 1,263,298 | Weber | Apr. 16, 1918 |
| 1,365,008 | Read | Jan. 11, 1921 |

FOREIGN PATENTS

| | | |
|---|---|---|
| 334,683 | Great Britain | Sept. 11, 1930 |